United States Patent [19]
Chan

[11] Patent Number: 5,659,541
[45] Date of Patent: Aug. 19, 1997

[54] REDUCING DELAY IN PACKETIZED VOICE

[75] Inventor: Norman Chin-Hung Chan, Louisville, Colo.

[73] Assignee: Lucent Technologies Inc., Murray Hill, N.J.

[21] Appl. No.: 501,327

[22] Filed: Jul. 12, 1995

[51] Int. Cl.[6] .................................. H04J 3/12; H04L 12/56
[52] U.S. Cl. ............................ 370/236; 370/252; 370/522
[58] Field of Search ...................... 370/58.1, 60, 60.1, 370/61, 68.1, 79, 80, 81, 94.1, 94.2, 110.1, 110.2, 110.3, 62, 17; 379/67, 88, 201

[56] References Cited

U.S. PATENT DOCUMENTS

| | | | |
|---|---|---|---|
| 4,147,896 | 4/1979 | Cannon et al. | 370/81 |
| 4,538,259 | 8/1985 | Moore | 370/60 |
| 4,726,019 | 2/1988 | Adelmann et al. | 370/60 |
| 5,007,043 | 4/1991 | Van Den Dool et al. | 370/60 |
| 5,042,032 | 8/1991 | Dighe et al. | 370/94.1 |
| 5,127,001 | 6/1992 | Steagall et al. | 370/62 |
| 5,426,640 | 6/1995 | Hluchyj et al. | 370/94.1 |
| 5,432,713 | 7/1995 | Takeo et al. | 370/94.1 |

*Primary Examiner*—Alpus H. Hsu

[57] ABSTRACT

The number of unprocessed packets accumulating at a point in a periodically sampled packet switching network carrying encoded voice information are counted and when the number of such unprocessed packets reaches a threshhold, or when the periodic sampling fails to detect the presence of a packet containing voice information a predetermined number of times, some of the packets, up to 20%, are discarded.

5 Claims, 1 Drawing Sheet

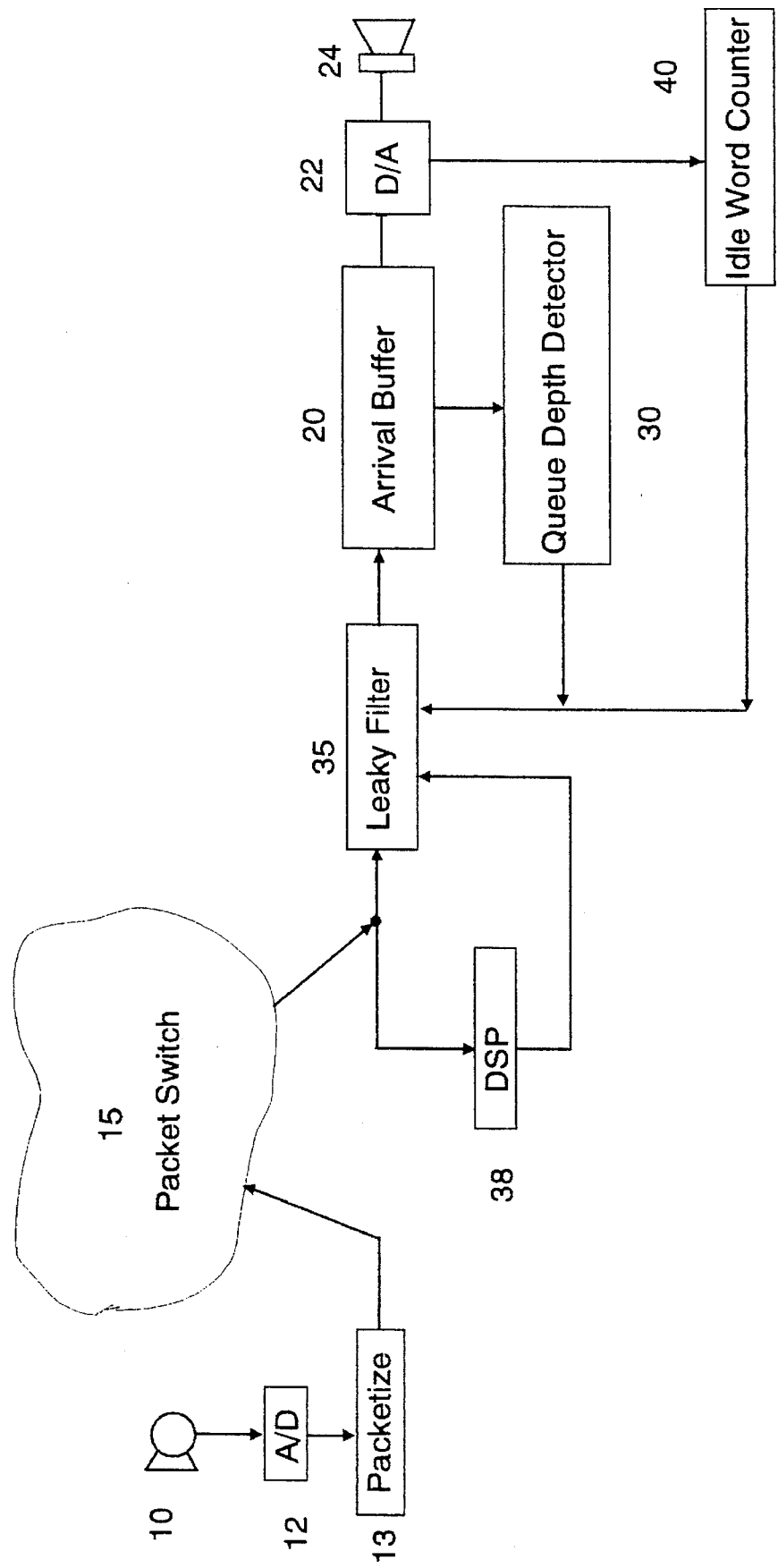

REDUCING DELAY IN PACKETIZED VOICE

FIELD OF THE INVENTION

This invention relates to packet transport and, more particularly, to packet switching of voice signals.

BACKGROUND OF THE INVENTION

While packet switching technology is a widely used and efficient means for transmitting digital data, some problems are encountered when it is attempted to employ a packet network for voice communication. While the conversion of a talker's analog voice signals into digital form for transmission through the network and subsequent re-conversion of the digital signals into analog signals for delivery to the listener are easily accomplished, it is in the nature of the packet network that certain delays can be introduced that can be disconcerting to parties involved in a conversation.

In a packet switching system, such as the well-known ethernet running the UDP (datagram) protocol, audio samples are sampled, typically at a rate of 8000 samples per second, the samples are digitized, quantified into packets containing address information, and then sent through the packet network. In such a system, the arrival rate of the packets from the source to the destination is a random variable. The arrival time of a packet may be expressed as a probabilistic time distribution, p(A). When transmitting data, this probabilistic distribution does not usually present a problem. However, in conducting a "live" conversation, each of the parties anticipates a response from the other within a familiar interval of time. If an expected response is not forthcoming within the expected interval, the delay may be disconcerting.

In a typical packet network, the queue of incoming digital packets is entered into one end of a shift register known as the arrival buffer. The arrival buffer is unloaded at its output stage, at its other end, where data words (containing data or speech samples) are removed to be processed and converted to analog speech by a digital to analog (D/A) converter. Because the arrival of packets is probabilistic, it is possible that the output stage of the arrival buffer, which is periodically sampled by the D/A converter, may be empty. If the output stage of the arrival buffer is empty when it is periodically sampled, the D/A converter generates silent intervals and the listening party hears silence. At the same time, a gross delay of one sample is introduced. For a typical system in which the sampling rate is 8000 Hz, samples are taken every 125 microseconds. Accordingly, if the output stage arrival buffer is empty when sampled, any data arriving before the next sampling interval may be delayed up to 125 microseconds and the average arrival queue size would be increased by one sample. If the number of probabilistic samples in the arrival buffer increases beyond a certain amount, a disconcerting delay will be introduced into the conversation beyond that occurring due to normal pauses in speech. While the accumulation of unprocessed bytes in the arrival queue is of no concern in one-way communication, such as a broadcast system, gross delay will become noticeable to most users engaged in a two-way conversation when it reaches approximately one-eighth of a second, corresponding to 1000 samples.

Accordingly, it would be advantageous to reduce the accumulation of probabilistic gross delay in packetized voice samples in a packet network without the need of increasing processing overhead.

SUMMARY OF THE INVENTION

In accordance with the principles of my invention, I reduce accumulated gross delay in packetized voice transmission by two methods. First I provide the arrival buffer of the packet network with a queue depth detector that measures the occupancy level of the arrival buffer. When the queue depth exceeds a predetermined threshhold, a fraction of the data samples in the arrival buffer are arbitrarily discarded. For example, to reduce accumulated delay to less than 0.1 second when the sampling rate is 8000 Hz, some data samples may be discarded when the occupancy level of the arrival buffer reaches 800 samples. Second, I provide the D/A converter with an idle word counter which is incremented whenever a silent output is produced by the D/A. When the count accrues to a predetermined threshhold some data samples in the arrival buffer are discarded. I have determined that up to about 20% of the samples in the arrival buffer may be discarded without severely degrading the intelligibility of voice. Whenever samples are so discarded, the idle word counter is reset.

Since the discarding of samples will effect a frequency shift in the detected information (because frequency is determined by the sampling rate divided by the period), if the transmitted samples are expected to contain in-band call signaling information, such as multifrequency tone signals, it is advisable to detect their presence as the frequency drift may cause tone detectors to malfunction. The detection of tone signals may, however, easily be accomplished within 10–20 milliseconds with the use of a conventional digital signal processor. When the digital signal processor detects tone signals, discarding of samples is temporarily inhibited.

DESCRIPTION OF THE DRAWING

The foregoing and other objects and features of my invention may become more apparent by referring now to the drawing the single figure of which shows an illustrative embodiment of an arrangement for discarding unprocessed packets when the number reaches a threshold that is a multiple of the product of the sampling rate and the acceptable number of seconds of delay in voice transmission.

DETAILED DESCRIPTION

Referring now to the drawing there is shown in schematic form an illustrative packet network which has been further simplified to show only the data transmission path from the talking party at the left, through the network in the center, to the listening party at the right.

At the lefthand side of the figure the talking party speaks into microphone 10, the analog voice samples are converted to digital signals by A/D converter 12. A/D converter samples the analog voice at a predetermined rate, typically 8000 Hz. Packetizer 13 (which, advantageously, may be located at the talking party location or at a nearby central office serving that location) assembles the digital signals and transmits them through the packet switching network 15 from which they arrive at the listening party location located at the righthand side of the figure. At the righthand side the received packet samples are entered into arrival buffer 20 (which may be located at the listening party location or at a nearby Central office serving that location) in digital form from which they are converted into analog signals by D/A converter 22. The analog signals are then passed over the local loop to the listening party's loudspeaker 24.

In accordance with the principles of my invention, however, there is associated with arrival buffer 20 a queue depth detector 30 which is set to detect when arrival buffer 20 contains more than a threshhold number of digital samples. For example, when the sampling rate is at 8 kHz, if 800 samples are present in arrival buffer 20 this represents a delay of 0.1 seconds. Where arrival buffer is implemented as a shift register, queue depth detector 30 simply counts the number of stages in the shift register which contain samples. An example of a prior art mechanism which may be employed to determine the number of entries in a shift register is described in E. S. Hoover, et al, U.S. Pat. No. 3,623,007 issued Nov. 23, 1971.

When the threshhold established in queue depth detector 30 is reached, leaky filter 35 is actuated to discard a predetermined number of the samples in arrival buffer 20. Leaky filter 35 may advantageously be programmed to perform in any of the following ways: (a) to discard one out of every "X" samples in buffer 20, where "X" is a predetermined fixed number; (b) to compute a random number "Y" and discard the "Yth" sample in buffer 20; or (c) to detect a group of low energy samples in buffer 20 (e.g., samples corresponding to a silent, non-speaking interval of talking party speech) and discard the samples of this group.

The detection of the arrival of a group of low energy samples may advantageously be performed by digital signal processor 38, which would also detect the arrival of samples corresponding to touch tone signalling information. An example of digital signal processor for detecting tone signaling is described in, for example, U.S. Pat. No. 4,718,057 issued Jan. 5, 1988.

As mentioned above, in-band signalling information may be carried in the packets of information arriving at the serving the listening party and the discarding of samples corresponding to such in-band signalling information may cause the detected information to be shifted from its actual frequency. It is the usual telecommunications practice to set a frequency tolerance, illustratively of the order of 2%, for such signaling information. See, for example, Touch-Tone/RTM calling—Requirements for, AT&T Compatibility Bulletin No. 105, Aug. 8, 1975. To prevent the discarding of samples in buffer 20 when the arriving samples correspond to in-band signalling information digital signal processor 38 inhibits leaky filter 35 from discarding samples in buffer 20 despite the fact that the threshhold of queue depth detector 30 may have been reached.

Idle word counter 40 counts the number of consecutive idle (silent) words read out of arrival buffer 20. When a predetermined number of idle words have appeared, counter 40 actuates leaky filter 35 and filter 35 discards a predetermined number of samples from arrival buffer 20. When samples are discarded, counter 40 is reset.

What has been described is deemed to be illustrative of the principles of my invention. Modifications may be made by those skilled in the art without however departing from the spirit and scope of my invention.

What is claimed is:

1. A method of preventing the accumulation of transmission delays beyond an acceptable number of seconds in a packet switching network carrying packets which include encoded voice and signaling information, comprising the steps of:

a. periodically sampling the packets arriving at a point in said network;

b. counting the number of unprocessed packets arriving at said point in said network;

c. counting the number of times said periodic sampling results in no voice information being detected;

d. discarding some of said packets when the number of said unprocessed packets and the number of times said periodic sampling results in no voice information being detected at said point reaches a threshold that is a multiple of the product of the sampling rate and the acceptable number of seconds of delay; and e. inhibiting said discarding when signaling information is detected by said sampling.

2. A method according to claim 1 wherein said sampling rate of said voice information is approximately 8000 samples per second and said threshhold multiple is within the range of approximately 800 to 1000 samples.

3. A method according to claim 2 wherein some of said packets include low energy information and wherein said discarding is controlled to discard only said packets containing said low energy information.

4. A method according to claim 2 wherein said discarding of said packets discards every nth one of said packets, where n does not exceed 20% of said arriving samples.

5. A method according to claim 4 wherein said number n is a random number which does not exceed 20% of the number of said arriving samples remaining unprocessed.

* * * * *